United States Patent
Lu

(10) Patent No.: US 10,402,211 B2
(45) Date of Patent: Sep. 3, 2019

(54) METHOD FOR PROCESSING INNOVATION-CREATIVITY DATA INFORMATION, USER EQUIPMENT AND CLOUD SERVER

(71) Applicant: INNO STREAM TECHNOLOGY CO., LTD., Beijing (CN)

(72) Inventor: Yizhong Lu, Beijing (CN)

(73) Assignee: INNO STREAM TECHNOLOGY CO., LTD., Beijing (CN)

( * ) Notice: Subject to any disclaimer, the term of this patent is extended or adjusted under 35 U.S.C. 154(b) by 216 days.

(21) Appl. No.: 15/331,769

(22) Filed: Oct. 21, 2016

(65) Prior Publication Data

US 2018/0113717 A1 Apr. 26, 2018

(51) Int. Cl.
| | |
|---|---|
| G06F 3/0481 | (2013.01) |
| G06F 3/0482 | (2013.01) |
| G06F 3/0484 | (2013.01) |
| G06F 3/0488 | (2013.01) |
| G06F 9/451 | (2018.01) |

(52) U.S. Cl.
CPC ............ G06F 9/451 (2018.02); G06F 3/0482 (2013.01); G06F 3/0488 (2013.01)

(58) Field of Classification Search
CPC .... G06F 9/4443; G06F 3/0482; G06F 3/0484; G06F 3/0481; G06F 3/04883; G06F 3/04842

See application file for complete search history.

(56) References Cited

U.S. PATENT DOCUMENTS

| | | | | |
|---|---|---|---|---|
| 8,694,788 | B1 * | 4/2014 | Thomas | H04L 63/08 713/165 |
| 2013/0173540 | A1 * | 7/2013 | Qian | G06Q 10/0875 707/625 |
| 2013/0191810 | A1 * | 7/2013 | Brandstetter | G06F 8/34 717/109 |

(Continued)

FOREIGN PATENT DOCUMENTS

| | | |
|---|---|---|
| CN | 103152182 A | 6/2013 |
| CN | 103514410 A | 1/2014 |

OTHER PUBLICATIONS

Chinese First Examination Report of corresponding China Application No. 201510335148.5, dated Jun. 12, 2017.

*Primary Examiner* — Shourjo Dasgupta
(74) *Attorney, Agent, or Firm* — J.C. Patents

(57) ABSTRACT

Disclosed is a method for processing innovation-creativity data information, a user equipment (UE) and a cloud server, which provide a user with an integrated data information collecting mode, allowing that innovation-creativity data information of a user be collected anytime, anywhere, through various means, and be sent to a cloud. A first data string is generated based on the data information, and preserving information returned from the cloud is received, which includes the first data string or a second data string. The first data string enables verification of data information integrity, ensuring integrity of the data information. The second data string includes trusted time information issued by a trusted time issuing device based on time when the first data string is received. The data information goes through a data-oriented online processing, realizing a seamlessly connected IP services for real-time protection of innovation and creativity.

17 Claims, 14 Drawing Sheets

(56) References Cited

U.S. PATENT DOCUMENTS

| | | | |
|---|---|---|---|
| 2013/0212521 A1* | 8/2013 | Fedoseyeva | G06Q 10/00 715/781 |
| 2015/0134425 A1* | 5/2015 | LeGris | G06Q 10/0639 705/7.38 |
| 2016/0054103 A1* | 2/2016 | Macher | F41J 3/02 700/92 |
| 2018/0253503 A1* | 9/2018 | Gao | G06Q 30/02 |

* cited by examiner

METHOD FOR PROCESSING INNOVATION-CREATIVITY DATA INFORMATION, USER EQUIPMENT AND CLOUD SERVER

TECHNICAL FIELD

Embodiments of the present disclosure relate to the field of data information storing technologies, as well as processing method and apparatus for Internet third-party storing of innovation-creativity data information, and particularly to a method for processing innovation-creativity data information, a user equipment (UE) and a cloud server.

BACKGROUND

As Internet-based solutions increasingly permeate into various aspects of our lives and works, a growing quantity of documents and knowledge are produced, stored and utilized in the form of data information. This is especially true in innovation/creation activities, where concepts of inventions and creations are recorded electronically. Moreover, a huge amount of invention and creation concepts and ideas need to be recorded and stored anytime, anywhere. Additionally, it is desirable that such records be stored and legally binding so as to attest the track and originality of the innovation/creation in the future. However, such storing and processing service platform is not yet known.

On another hand, when an innovative/creative idea or outcome needs a certain type of intellectual property (IP) protection, an existing approach would be that the inventor has to compile the documents, and hunt for some professionals who may handle related transactions and procedures. Obviously, such approach suffers various issues, such as procedural and transactional delays, difficulties compiling required documents, and mismatch in resource docking, leading to higher cost and lower efficiency, and even to failure to protect an innovative/creative idea or outcome in time. Moreover, innovative/creative ideas or outcomes are often stored in different data processing applications (APPs). That means the user have to start various data information processing APPs if different types of data information need to be collected. For example, when voice record is required, a recorder APP will be started; if text record is required, a note pad APP will be started. Moreover, data information collected by each of the various APPs is also kept separately, making it difficult for data information from related events to be stored in a unified manner.

An additional defect lies in that, without an Internet-based or mobile network-based solution that supports data processing modes, such as any-time any-where protection, centralized automatic integration, fragment automatic connection and interface to a professional platform, etc. for the innovative/creative ideas or outcomes, there exist a considerable threshold of giving the innovative/creative ideas or outcomes IP rights, thus hindering the use of IP and weakening the driving effect expected of IP for innovative works.

SUMMARY

Accordingly, the present disclosure provides a method for processing innovation-creativity data information, a user equipment (UE) and a cloud server, allowing that innovation-creativity data of a user be collected anytime, anywhere, through various means, be stored in real-time through mobile Internet based solutions, thereby ensuring primariness and integrity of the innovation-creativity data, further changing existing IP service modes and data processing procedures, which helps users to improve the efficiency and effect of IP protection for their innovation-creativity data.

The present disclosure provides a method for processing innovation-creativity data information, including:
displaying a login interface to a user, and receiving login information inputted on the login interface by the user;
after a successful login, displaying a collecting mode selecting interface including at least two data information collecting modes to the user;
receiving a selecting instruction triggered by the user on the collecting mode selecting interface, and displaying a data information input interface corresponding to a selected collecting mode to the user;
receiving data information inputted by the user on the data information input interface, and storing the data information in a UE, and/or sending the data information to a cloud server for storage,
where the sending the data information to a cloud server for storage includes:
generating a first data string based on the data information; sending the data information and the first data string to the cloud server, enabling the cloud server to verify integrity of the data information according to the first data string; receiving the first data string or a second data string returned from the cloud server, and displaying cloud server preserving information on a current page; if the first data string or the second data string returned from the cloud server is not received, displaying a non-preserving information on the current page, the non-preserving information indicating that the data information is not preserved as evidence on the cloud server, and storing the data information in the UE,
where the second data string includes the first data string and time information, and the time information is trusted time information issued by a trusted time issuing device based on time when the first data string is received.

The present disclosure further provides a method for processing innovation-creativity data information, including:
receiving a first data string and data information sent from a user equipment (UE); verifying integrity of the data information using the first data string, where the first data string is generated based on, and uniquely associated with the data information;
if the verification is successful, sending to a trusted time issuing device a trusted time issuing request carrying the first data string, enabling the trusted time issuing device to issue trusted time information based on time when the request is received;
receiving a response from the trusted time issuing device, where the response includes a second data string that includes the first data string and the trusted time information; and
storing the second data string in association with the first data string.

The present disclosure further provides a user equipment (UE), including: a processor, a memory, and a displaying interface, where:
the displaying interface includes:
a first interactive interface for displaying a login interface to a user;
a second interactive interface for displaying, after a successful login, a collecting mode selecting interface including at least two data information collecting modes to the user;

a third interactive interface for showing a data information input interface corresponding to a selected collecting mode to the user;

where the processor is configured to: trigger the display of the first interactive interface, receive login information inputted by the user on the first interactive interface; after the successful login, trigger the display of the second interactive interface, and receive a collecting mode selecting instruction triggered by the user on the second interactive interface; display the third interactive interface corresponding to the selected collecting mode to the user; receive data information inputted by the user on the third interactive interface, and store the data information in the memory, and/or send the data information to a cloud server for storage;

where the processor is specifically configured to: generate a first data string based on the data information; send the data information and the first data string to the cloud server, enabling the cloud server to verify integrity of the data information according to the first data string; receive the first data string or a second data string returned from the cloud server, and display cloud server preserving information on a current page; if the first data string or the second data string returned from the cloud server is not received, display non-preserving information on the current page, the non-preserving information indicating that the data information is not preserved as evidence on the cloud server, where the second data string includes the first data string and time information, and the time information is trusted time information issued by a trusted time issuing device based on time when the first data string is received.

According to the disclosed method for processing innovation-creativity data information, the UE and the cloud server, a user is provided with an integrated data information collecting mode which, following the user login, allows that innovation-creativity data of the user be collected anytime, anywhere, through various means, and be sent to the cloud. A first data string is generated based on the data information, and is sent to the cloud server. Then, preserving information returned from the cloud server is received, where the preserving information includes the first data string or a second data string. The first data string enables verification of data information integrity, ensuring integrity of the data information. The second data string includes trusted time information issued by a trusted time issuing device based on the time when the first data string is received. The data information goes through a data-oriented online processing, realizing a real-time legitimate evidence preserving for the innovation-creativity data, significantly reducing information asymmetry in protecting innovation and creativity, also allowing that the data information and an intellectual property (IP) licensing platform be integrated together, accelerating the bonding between the innovator end and the service end, and creating a fast response mode between the UE and a cloud platform, thereby realizing a seamlessly connected IP services for real-time protection of innovation and creativity.

BRIEF DESCRIPTION OF DRAWINGS

FIGS. 6A to 6I are schematic diagrams of interfaces shown when the exemplary embodiment in FIG. 6A is implemented;

DESCRIPTION OF EMBODIMENTS

In order to make objectives, technical solutions and advantages of embodiments of the present disclosure clearer, the technical solutions in embodiments of the present disclosure will be described hereunder clearly and comprehensively with reference to accompanying drawings in embodiments of the present disclosure. Obviously, the described embodiments are only a part of embodiments of the present disclosure, rather than all of them. Any other embodiments obtained by persons skilled in the art based on the embodiments of the present disclosure herein without making any creative effort shall fall into the protection scope of the present disclosure.

Figure 1:
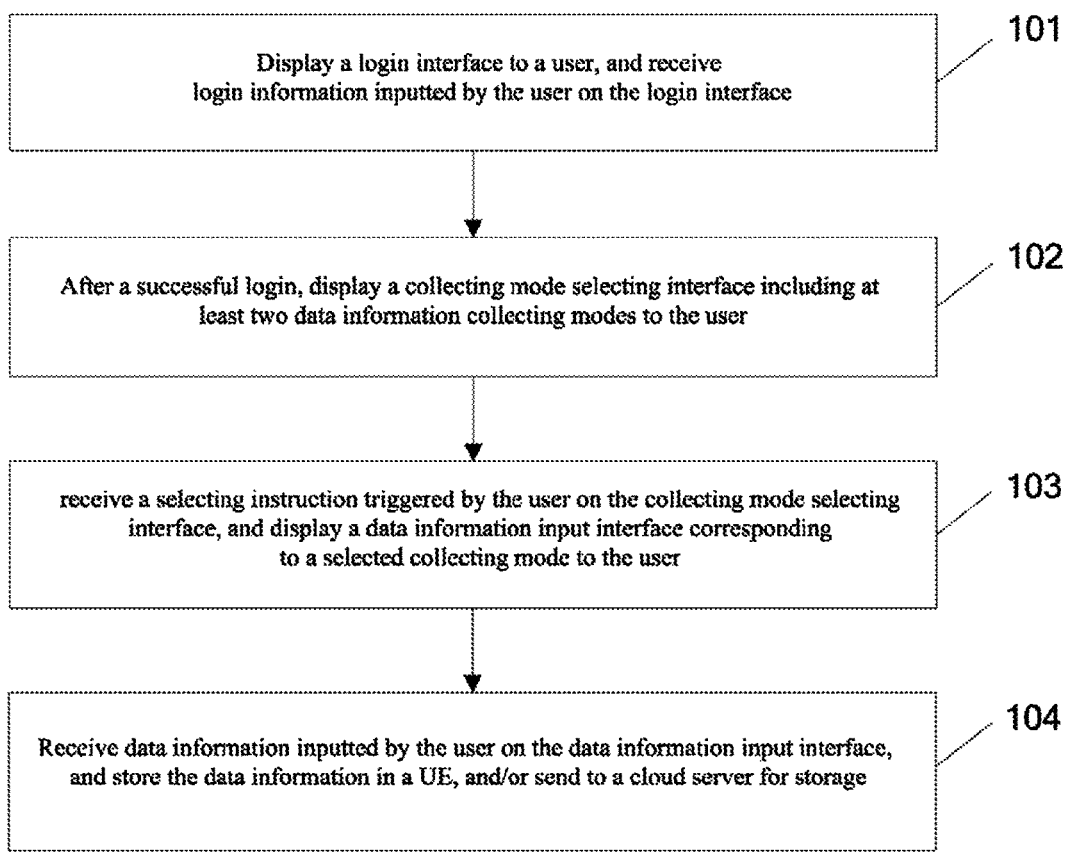
FIG. 1 is a flowchart of a first embodiment of a method for processing innovation-creativity data information according to the present disclosure.

FIG. 1 is a flowchart of a first embodiment of a method for processing innovation-creativity data information according to the present disclosure. The data information processing method provided by the present embodiment applies to collecting and evidence preserving for any innovation-creativity data information, so as to offer diversified data information collection means anytime and anywhere, ensuring primariness and integrity of the data information. As depicted in FIG. 1, the method particularly includes the following steps:

At step 101, display a login interface to a user, and receive login information inputted on the login interface by the user.

At step 102, after a successful login, display a collecting mode selecting interface including at least two data information collecting modes to the user.

At step 103, receive a selecting instruction triggered by the user on the collecting mode selecting interface, and display a data information input interface corresponding to a selected collecting mode to the user.

At step 104, receive data information inputted by the user on the data information input interface, and store the data information in a user equipment (UE), and/or send to a cloud server for storage.

Particularly, the UE may be a laptop, a smartphone, a tablet or any other electronic device equipped with a processing unit. The interactions involved during the aforementioned steps may be realized through a client application provided on the UE or in a web page form. The innovation-creativity data information may be data information in any format, with the content being any of text, image, audio/video, web page, short message, email or any form in which data information may be presented for an innovative and creative concept and idea that the user might think of or see at anytime anywhere.

When a user desires to record and store his/her innovation-creativity data information, a login interface is displayed via the UE. After login information input and successful login, a collecting mode selecting interface is displayed, where the collecting mode selecting interface includes various data information collecting modes, offering a diversity of choices for the user to collect the innovation-creativity data information, and integrating various collecting modes at one place easily accessible for the user.

The UE receives a selecting instruction inputted by the user on the collecting mode selecting interface, which instructs the UE to display a data information input interface corresponding to the selected collecting mode to the user. For example, if the user selects a text collecting mode, the user is shown a text information input interface; and if the user selects an audio/video collecting mode, the user is shown an audio or video real-time input interface. When data information inputted by the user on the data information input interface is received, the data information may be imported from a memory space on the UE, or inputted from other third-party device, or may be data information generated in real-time, e.g. a video, photo or audio that is being captured. Such data information is also stored. When Internet access is unavailable, the UE may optionally store the data information on the UE. When Internet access is available, the data information may optionally be sent to a cloud server for storage.

Figure 2:
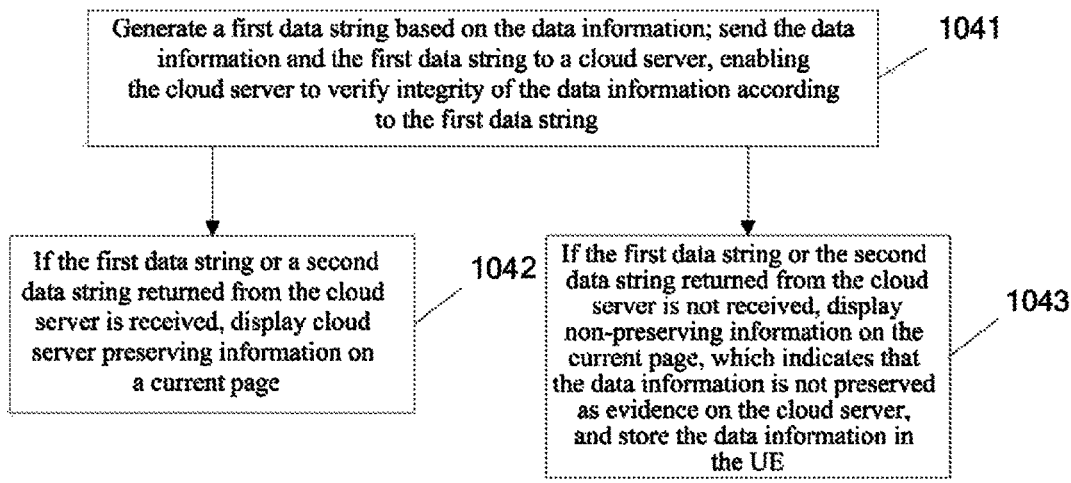
FIG. 2 is a flowchart of storing data information on a cloud server in the first embodiment of the method for processing innovation-creativity data information according to the present disclosure.

Here, at step 104, when the data information is sent to the cloud server for storage, as illustrated in FIG. 2 which shows the flowchart of storing data information on a cloud server for the first embodiment of the method for processing innovation-creativity data information according to the present disclosure, the method further includes the following steps:

At step 1041, generate a first data string based on the data information, and send the data information and the first data string to the cloud server, enabling the cloud server to verify the integrity of the data information according to the first data string. If the first data string or the second data string returned from the cloud server is received, step 1042 is carried out; and if not received, step 1043 is performed.

Here, the second data string includes the first data string and time information, and the time information is trusted time information issued by a trusted time issuing device based on the time when the first data string is received.

In particular, the UE generates the first data string based on the data information, and send the data information and the first data string to the cloud server. The first data string serves as a unique identification (ID) for the data information, so that the cloud server may verify the integrity of the received data information according to the first data string. According to the needs of practical application scenarios, the UE may also send to the cloud server account information, operator information, device information, upload time information, and read-me information about the data information or the like, helping the cloud server to manage the first data string and/or the data information. The UE may process the data information according to a predetermined hash algorithm, e.g. MD5 (Message Digest Algorithm), SHA (Secure Hash Algorithm) to produce a hash code, i.e. the first data string, for the data information. In order to enhance the security of data transfer, data exchange between the UE and the cloud server may be conducted through an encrypted HTTP (Hyper Text Transfer Protocol) channel. The first data string and the data information may be sent sequentially or simultaneously, based on the size of the data information and/or network condition. The order in which the cloud server receives the first data string and the data information may also vary. When the size of the data information is large, longer transmission time might be required. In such case, the first data string may be the first one received at the cloud server. When the first data string is acquired, the cloud server stores the first data string, and requests for trusted time from a trusted time issuing device. The time of the trusted time issuing device is in synchronization with a reliable time source that, in particular, includes: a long wave signal or satellite signal issued by a time service center for identifying reliable time, or reliable time issued by a time licensing institution, or reliable time issued by a hardware system complying with requirements of relevant standards, such as an atomic clock, whose implementation is not limited in the present embodiment, as long as ensuring that the time with which the reliable time source synchronizes is reliable and auditable. Particularly, the cloud server sends to the trusted time issuing device a trusted time issuing request that carries the first data string. The trusted time issuing device logs the time when the first data string is received, and issues the time as the trusted time information to the cloud server. The trusted time issuing device responds to the cloud server with the second data string that includes the first data string and time information (i.e. the trusted time information).

At step 1042, display cloud server preserving information on a current page.

At step 1043, display non-preserving information on the current page, the non-preserving information indicating that the data information is not preserved as evidence on the cloud server, and store the data information in the UE.

In particular, if the data information is successfully preserved as evidence on the cloud server, which is indicated by obtaining the trusted time information eligible for attesting the time point at which the innovation-creativity data is originally created, cloud server preserving information is displayed on the current page. The preserving information may be shown as the first data string or the second data string, or any other information ID that represents evidence being preserved. If the data information is, for some cause (e.g. network interruption), not successfully preserved as evidence on the cloud server, the non-preserving information is displayed on the current page to indicate that the data information is not preserved as evidence on the cloud server. The data information is then stored in the UE to allow the UE to resend the data information to the cloud server later.

The method for processing innovation-creativity data information in the UE of this embodiment provides a user with an integrated data information collecting mode which, following the user's login, allows that innovation-creativity data of the user be collected anytime, anywhere, through various means, and be sent to the cloud. A first data string is generated based on the data information, and is sent to the cloud server. Then, preserving information returned from the cloud server is received, where the preserving information includes the first data string or a second data string. The first data string enables verification of data information integrity, ensuring integrity of the data information. The second data string includes trusted time information issued by a trusted time issuing device based on the time when the first data string is received. The data information goes through a data-oriented online processing, realizing a real-time legitimate evidence preserving for the innovation-creativity data, significantly reducing information asymmetry in protecting innovation and creativity, also allowing that the data information and an intellectual property (IP) licensing platform be integrated together, accelerating the bonding between the innovator end and the service end, and creating a fast response mode between the UE and a cloud platform, thereby realizing a seamlessly connected IP services for real-time protection of innovation and creativity.

On the basis of the first embodiment, the method may further include: displaying a list of data information which is not stored on the cloud server; receiving a triggered operating instruction by which the user selects data information; displaying, to the user, prompt information on whether the selected data information is to be sent to the cloud server; if the user responds affirmatively, sending the selected data information to the cloud server and receiving the first data string or the second data string returned from the cloud server; and updating the state of the selected data information to an evidence preserved state, so as to secure for the user a first-to-invent time that is needed in protecting the innovation-creativity data.

Further, the data information collecting mode may be any of the following:

Data information collected as text:

Accordingly, at step 104, the receiving data information inputted by the user on the data information input interface includes: receiving in real-time text data information inputted by the user, or receiving text data information selected by the user from a local memory.

Or, data information collected as image:

Accordingly, at step 104, the receiving data information inputted by the user on the data information input interface includes: receiving in real-time image data information captured by the user, or receiving image data information selected by the user from a local memory.

Or, data information collected as audio record:

Accordingly, at step 104, the receiving data information inputted by the user on the data information input interface includes: receiving in real-time audio data information recorded by the user, or receiving audio data information selected by the user from a local memory.

Or, data information collected as video record:

Accordingly, at step 104, the receiving data information inputted by the user on the data information input interface includes: receiving in real-time video data information recorded by the user, or receiving video data information selected by the user from a local memory.

Or, data information collected as file:

Accordingly, at step 104, the receiving data information inputted by the user on the data information input interface includes: receiving a file selected by the user from a local memory and/or a third-party device.

In particular, the data information may be collected as any one of text, audio, video, file or a combination thereof, either collected in real-time or selected from a local memory. When the collecting mode is file collecting, the data information may also be selected from a third-party device. Thus the user is provided with a diversity of data information collecting modes that are flexibly integrated together, providing significant convenience to the user and strong operability.

Figure 3A:
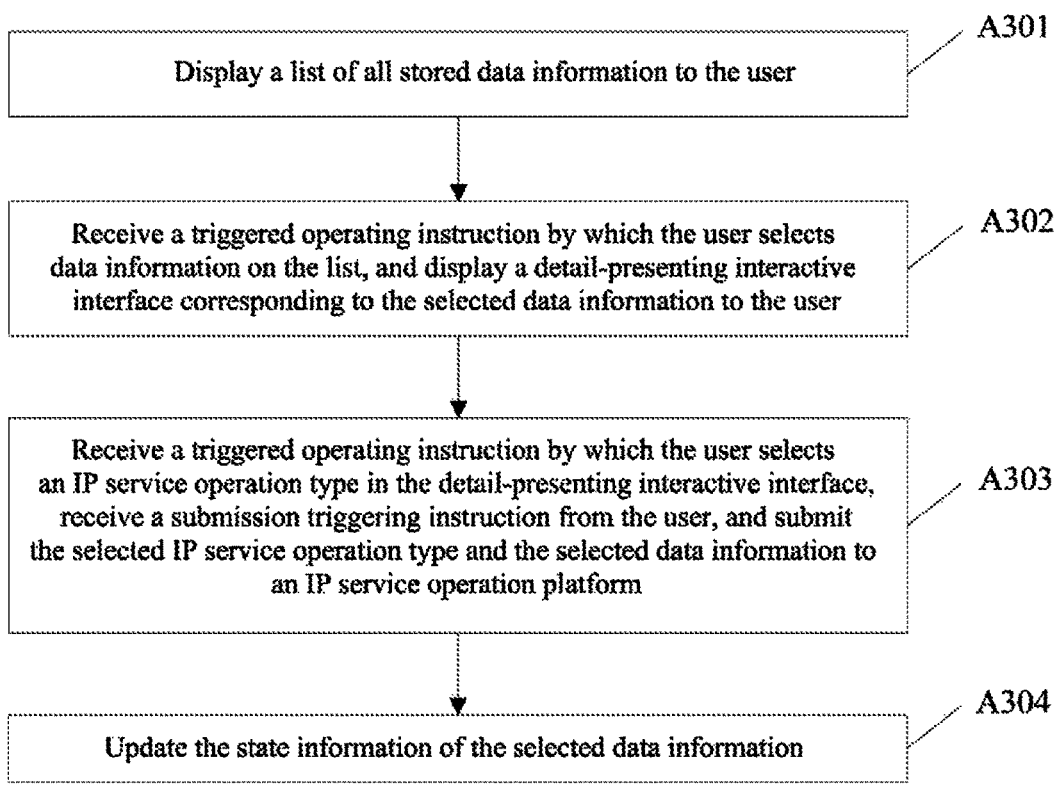
FIG. 3A is a flowchart of a second embodiment of a method for processing innovation-creativity data information according to the present disclosure.
Figure 3B:
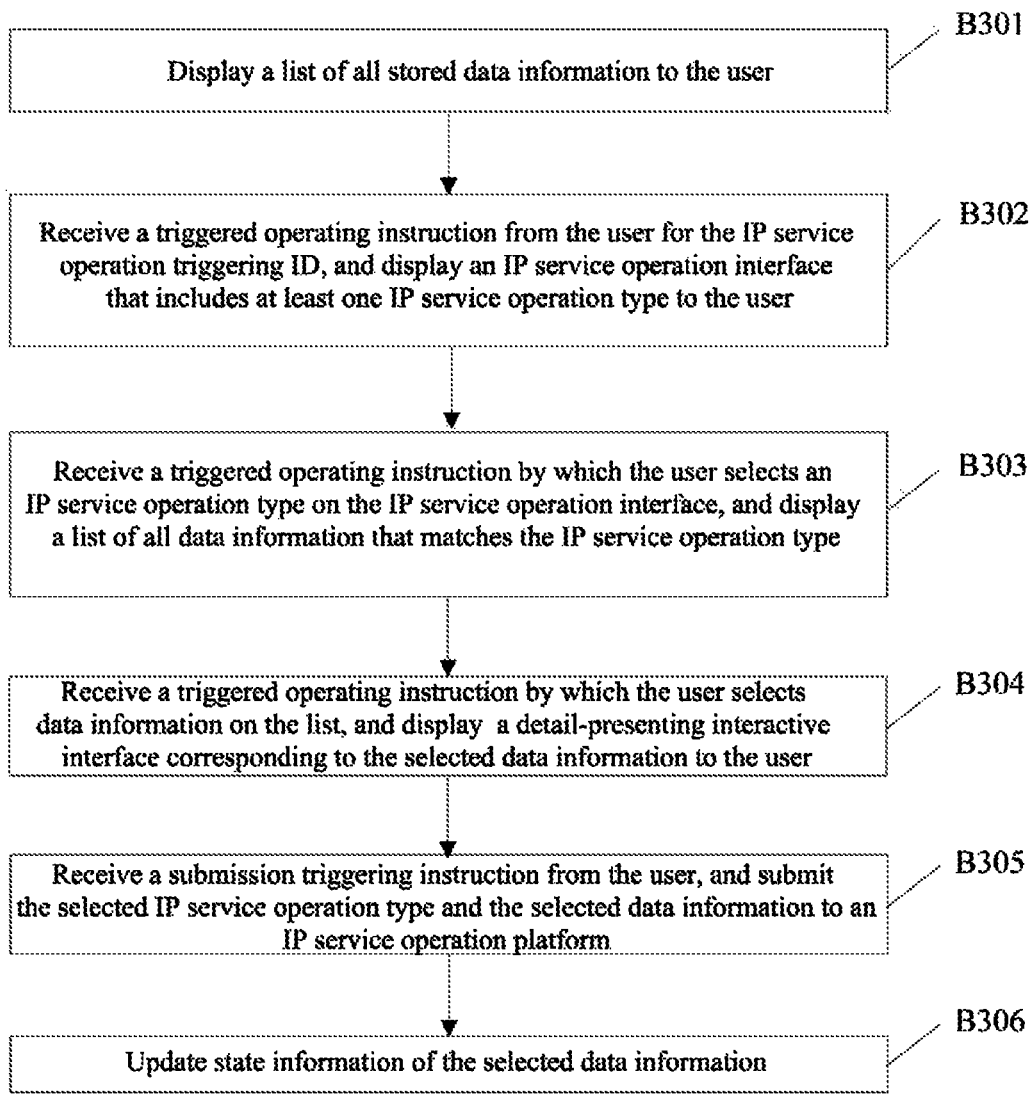
FIG. 3B is another flowchart of the second embodiment of the method for processing innovation-creativity data information according to the present disclosure.

On the basis of the above embodiment, FIG. 3A illustrates a flowchart of a second embodiment of a method for processing innovation-creativity data information according to the present disclosure, and FIG. 3B illustrates another flowchart of the second embodiment of the method for processing innovation-creativity data information according to the present disclosure. As depicted in FIGS. 3A and 3B, at step 104, after the storing the data information on the UE and/or sending the data information to the cloud server for storage, the method further includes:

At step A301, display a list of all stored data information to the user.

The list of data information includes identification (ID) of each stored data information, an intellectual property (IP) service operation triggering ID, and state information of each data information.

In particular, all stored data information are displayed to the user in the form of a list, where the list presents: the ID, which may be a name, serial number, first data string, second data string or any other identification information, for each data information; the IP service operation triggering ID for triggering information associated with IP service operations, e.g. trade mark, patent, preserving certificate issuing, etc.; and the state information of each data information, which may be employed to indicate information associated with a processing state that the data information is currently undergoing. The state may indicate, for example, whether the data information has any preserving information with trusted time, or whether the data information is "confidential" or "public", i.e. whether the data information is visible to anyone, or whether the data information is seeking IP protection.

At step A302, receive a triggered operating instruction by which the user selects data information on the list, and display a detail-presenting interactive interface corresponding to the selected data information to the user.

The detail-presenting interactive interface includes at least one IP service operation type.

In particular, the user is shown the detail-presenting interactive interface that corresponds to the data information selected by the user in the list of data information. The detail-presenting interactive interface may present particular content of the data information, as well as associated information, e.g. the creation time, the creator, the trusted preserving time, the belonging folder or the like. The user is also offered with a variety of alternative IP service operation types, e.g. trade mark application, patent application, etc., allowing the user to apply appropriate IP protection for the data information.

At step A303, receive a triggered operating instruction by which the user selects an IP service operation type in the detail-presenting interactive interface, and receive a submission triggering instruction from the user, so as to submit the selected IP service operation type and the selected data information to an IP service operation platform.

In particular, the inventor or creator is only required to submit the data information seeking IP protection, together with the operation type, to a professional platform for IP service operations, thus lifting the burden of self-compiling the documents and going through the tedious application procedures of the inventor or creator. Hence, IP protection application becomes more efficient, and the innovative/creative idea or outcome of the inventor or creator may enjoy a timely and professional protection.

At step A304, update the state information of the selected data information.

The state information is updated for the data information for which an IP service application has been submitted, allowing the UE to better maintain the data information stored by the user and allowing the user to learn the latest event of the innovation-creativity data information.

Or, in an alternative implementation, at step 104, after the storing the data information in the UE and/or sending the data information to the cloud server for storage, the method further includes:

At step B301, display a list of all stored data information to the user.

The list of data information includes identification (ID) of each stored data information, an intellectual property (IP) service operation triggering ID, and state information of each data information.

This step is implemented in a process similar to that of step A301, which will not be repeated herein.

At step B302, receive a triggered operating instruction from the user for the IP service operation triggering ID, and display an IP service operation interface that includes at least one IP service operation type to the user.

In particular, the IP service operation triggering ID may be in the form of an translucent floating window, a button, or the like, which will not be limited in the present disclosure. With the perspective of service operation type, an alternative operating interface is provided to display an interface for selecting from various IP service operation types when the user triggers the IP service operation triggering ID. The user may optionally follow step A302 or step B302 according to individual preference or need.

At step B303, receive a triggered operating instruction by which the user selects an IP service operation type on the IP service operation interface, and display a list of all data information that matches the IP service operation type.

In particular, a list of data information is shown to match the IP service operation type selected by the user on the IP service operation interface. For example, a user might desire that an electronic preserving certificate with legal effect be issued for data information which has been stored on the cloud server, so as to attest trusted time when the data information is originally created. The preserving certificate may record the first data string or second data string, user's real name, the preserving time corresponding to the trusted time information and the like. After the user has chosen the operation type of issuing certificate, the UE scans through all data information, and lists those for which not certificate has yet been requested, so that the user may swiftly pick out the target, making certificate issuing more efficient.

At step B304, receive a triggered operating instruction by which the user selects data information on the list, and display a detail-presenting interactive interface corresponding to the selected data information to the user.

At step B305, receive a submission triggering instruction from the user to submit the selected IP service operation type and the selected data information to an IP service operation platform.

At step B306, update the state information of the selected data information.

For the particular implementation of the steps B304-B306, the aforementioned steps A302-A304 may be referred to, and will not be repeated herein.

According to the method for processing the innovation-creativity data information in the UE of this embodiment, by diversifying data information collecting modes, flexibility is further improved for collecting the data information, increasing data information collecting efficiency, and facilitating user innovation-creativity data collection anytime, anywhere, through various means. A plurality of operating modes are also provided to associate the data information list with the IP service operation types, enhancing flexibility in usage by users with different UE usage patterns and different service operation needs.

Further, on the basis of the foregoing embodiments, after the receiving a triggered operating instruction by which the user selects an IP service operation type and the receiving a triggered operating instruction by which the user selects data information, the method further includes:

Display a service need input interface corresponding to the selected service operation type; acquire service need information required by the service need input interface; and receive a triggering instruction from the user to trigger submission of the service need information.

Accordingly, at stepA303 or B305, the submitting the selected IP service operation type and the selected data information to an IP service operation platform, particularly includes: packaging the selected data information and the service need information and submitting to the IP service operation platform.

In particular, the service need information may be: ID number of a personal applicant seeking IP protection, information about an organizational applicant, contact information, mailing address, and inventor information for the innovation-creativity data. If any agency is commissioned to handle the IP procedures, the service need information may further include information such as the Power of Attorney (PoA) and the like. Here, the service need information may be extracted from the user information locally stored in the UE, and/or the legal information stored on the IP service operation platform. For example, if a user had previously applied for IP protection for some other data information, relevant user information might be locally stored on the UE. Later, when a new application is requested, such stored user information may be automatically associated to on the service need input interface, or alternatively extracted from legal information, for example legal documents such as user signed PoA or government issued certificate of reduction and postponement of payment, stored on the IP service operation platform.

Further, on the basis of the foregoing embodiments, after the receiving the triggered operating instruction by which the user selects an IP service operation type and the receiving the triggered operating instruction by which the user selects data information, the method further includes:

receiving inputted service supplementary information, and submitting the service supplementary information to the IP service operation platform. The service supplementary information is additional descriptions by the user for the data information or the service need information, which may be data information in text, audio/video, image or any other form.

Preferably, the receiving inputted service supplementary information may include: triggering an application (APP) corresponding to voice or video recording or photo capturing; and collecting service supplementary information in a format corresponding to the APP; or, selecting the service supplementary information from a file locally stored in the UE. For example, the user may directly capture a photo of his/her identification card or orally inform the IP service operation platform about the service need information, saving time for the user and eliminating the inconvenience of typing characters.

Further, on the basis of the foregoing embodiments, while any text information input interface is displayed to the user, a voice input identifier is displayed. If it is received that a voice input identifier instruction is triggered by the user, a voice recognition program will be triggered to convert, in real-time, the voice information into text information, and display and store the converted text information.

The voice input identifier may provide the user an alternative operating mode for converting the voice information into text information in real-time, facilitating user access and improving operation handling efficiency. Additionally, the user may edit the converted text to ensure accuracy of the voice conversion.

Further, after submitting to the IP service operation platform any one or more of the IP service operation type, data information, service need information, and service supplementary information, the method further includes:

In one implementation: generate an unsigned document required by an operation corresponding to the selected IP service operation type, and send the unsigned document to a user registered communication APP. Here, the registered communication APP may include at least one of a socializing APP, short messaging, multimedia messaging (MMS), mail and instant messaging (IM) APP.

In particular, the socializing APP may be, for example, Weibo, WeChat Moments or the like. The unsigned document may alternatively be pushed to the user through an instant messaging (IM) APP, e.g. WeChat, QQchat or the like, so that the user may timely and conveniently acquire such unsigned document.

Further, after submitting to the IP service operation platform any one or more of the IP service operation type, data information, service need information, and service supplementary information, the method further includes:

In another implementation, display an interactive interface for an unsigned document required by an operation corresponding to the selected IP service operation type; display a document signing window to the user for receiving signature information inputted by the user via the document signing window; and send the signature information to the cloud server or the IP service operation platform.

In particular, the user may electronically sign the document on the document signing window with finger sweeps or an electronic pen. The electronic signature may be saved as an image or strokes by the UE, and be sent as legally binding execution information to the cloud server or IP service operation platform for storage. Alternatively, bio-identification technology may also be employed, such as recognizing the user's identification using his/her bio-features, which mainly includes: finger recognition, retina recognition, voice recognition and the like. Particularly, the bio-features may be collected to the cloud server or IP service operation platform, so that when the user presses his/her finger prints in the document signing window or presents retina to the camera or speaks into a microphone, if such bio-feature matches those stored on the cloud server, then the validity of the signature information is confirmed.

After submitting to the IP service operation platform any one or more of the IP service operation type, data information, service need information, and service supplementary information, the method further includes:

receiving an operation acceptance message returned from the IP service operation platform; pushing an operation order generation message to the user; receiving notification information indicating that the user has completed a payment according to the operation order generation message; updating the state information of the data information; and displaying a list of updated data information. Here, the receiving notification information indicating that the user has completed a payment according to the operation order generation message includes: receiving notification information indicating that the user has completed a payment, via a third party payment processing platform, according to the operation order generation message.

Further, on the basis of the foregoing embodiments, after login information inputted on the login interface by the user is received, user signature information for the data information may further be received and verified, and a login successful message is displayed after passing the verification.

In particular, the user may download at the UE end a digital certificate, or employ an authenticating electronic device, e.g. a UKey, to ensure a secondary authentication that may become helpful in case of a login account being breached or in ill-intended unauthorized use.

According to the method for processing the innovation-creativity data information in the UE of this embodiment, the Internet is brought in to bond IP service operations with the user's innovation-creativity data information, utilizing data-oriented online processing facilitated by the Internet, which helps reducing conventional information asymmetry in user's innovation and creativity data information and IP service operations, accelerating the tight bonding between the IP sector service end and the innovator end, thereby enabling a UE equipped with the disclosed innovation-creativity data information processing capability to offer high flexibility, customizability, and quick response to market need etc. Hence, a fast response mode is created between the UE and a cloud platform, thereby realizing a seamlessly connected IP services for real-time protection of innovation and creativity.

Figure 4:
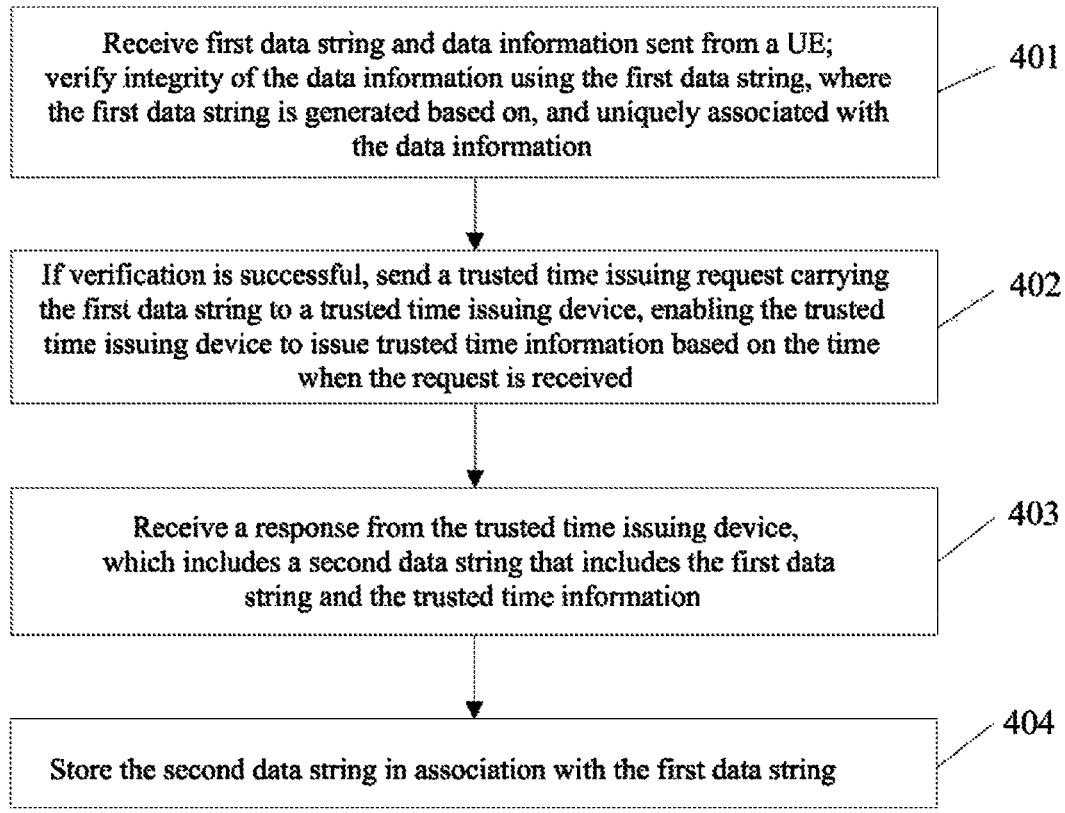
FIG. 4 is a flowchart of a third embodiment of a method for processing innovation-creativity data information according to the present disclosure.

FIG. 4 is a flowchart of a third embodiment of a method for processing innovation-creativity data information according to the present disclosure. The innovation-creativity data information processing method provided by the present embodiment applies to preserving any innovation-creativity data information, ensuring primariness and integrity of the innovation-creativity data information. The innovation-creativity data information processing method provided by the present embodiment may be implemented based on an evidence-preserving system which may include: the UE according to any of the foregoing embodiments; a cloud server end that has preserving capabilities; and a trusted time issuing device that can issue reliable trusted time of evidence preserving. The method may be carried out via the cloud server, and particularly include the following steps:

At step 401, receive a first data string and data information sent from a UE; verify the integrity of the data information using the first data string, where the first data string is generated based on, and uniquely associated with the data information.

In one implementation, the UE generates a first data string based on the data information, and send the same, together with the data information, to the cloud server end which has evidence preserving capabilities. When the first data string and the data information are received, the cloud server may start by verifying the data information according to the first data string so as to ensure integrity of the data information. In this case, a separate integrity verifying mechanism is not required between the cloud server and the UE, and the cloud server may realize verification of the data information using the first data string. The integrity verification may particularly include: obtaining a verification code by processing the data information according to a predetermined hash algorithm; and comparing the verification code with the first data string. If the verification code is the same as the first data string, the verification is passed. If the verification is passed, the data information will be stored in association with the first data string. If, however, the verification code is not the same as the first data string, the verification is failed, and retransmission indicating information is sent to the UE. Particularly, the integrity verification process may be that: the cloud server obtains a verification code by processing the data information according to the predetermined hash algorithm, where the predetermined hash algorithm is the same as that used by the UE to generate the first data string. By introducing the hash code, integrity verification for the data information may be performed in a simple and convenient manner. If the verification code is the same as the first data string, verification is successful. Otherwise, the verification is failed. If the verification is failed, the cloud server transmits instructing information to the UE to indicate an uploading failure or to request a retransmission, so as to prompt the user to re-upload the data information. If the verification is passed, the data information will be stored in association with the first data string, and the trusted time issuing device will be requested for trusted time information. Considering the massive amount of user interactions and data storage, the interactions between the cloud server and the UE may be conducted through peer-to-peer (P2P) technologies. The cloud server may store the user uploaded data information in a storage device, which may be a distributed storage device. After storing the data information in the storage device, the cloud server may acquire the storage address, and store the storage address in association with the first data string.

In an alternative implementation, the functionality on the UE may be simplified such that the UE sends the data information to the cloud server for generating the first data string based on the data information. For the purpose of ensuring data integrity during the transfer, additional verification bits or other verification means may be introduced into the data transfer protocols between the UE and the cloud server, so as to prevent data lose during the transfer.

At step 402, if the verification is successful, send a trusted time issuing request carrying the first data string to a trusted time issuing device, so that the trusted time issuing device issues trusted time information based on the time when the request is received.

In particular, after the first data string is received, the trusted time issuing device records trusted time information on when the issuing request is received, where the trusted time information is sourced from a standard time source.

As an example only, the trusted time issuing device may have an issuing server that synchronizes system time with the standard time source, and use the system time in synchronization with the standard time source as the trusted time information corresponding to the issuing request. Here, the standard time source is authoritative time in compliance with related standards, including: time published by a nationally or internationally authoritative time service institution, e.g. the National Time Service Center; or time recognized by the nationally or internationally authoritative time service institution. The precision of the time included in the trusted time information may be adjusted according to the practical need. For example, when the precision of the trusted time information is in the order of seconds, the format may particularly be: YYYYMMDDhhmmss. For example, it may look like: 20150310115625. Here, each partition is explained in the following: (a) YYYY indicates the year in four digits, e.g. 2015; (b) MM indicates the month, a month with one digit will have a preceding 0, and a month may be, e.g. 03, 11; (c) DD indicates the day, a day with one digit will have a preceding 0, and a day may be, e.g. 01, 10; (d) hh indicates the hour, an hour with one digit will have a preceding 0, and an hour may be, e.g. 03, 11; (e) mm indicates the minute, a minute with one digit will have a preceding 0, and a minute may be, e.g. 05, 56; and (f) ss indicates the seconds, a second with one digit will have a preceding 0, and a second may be, e.g. 01, 25. If the required precision is in the order of milli- or micro-seconds, a fractional portion of the second may be used.

At step 403, receive a response from the trusted time issuing device, the response including a second data string that includes the first data string and the trusted time information.

At step 404, store the second data string in association with the first data string.

Further, on the basis of the foregoing embodiments, the second data string may be a data string signed by the trusted time issuing device using an issuing private key.

Particularly, the trusted time issuing device uses its issuing private key to sign the second data string. The signing may be performed using RSA, ElGamal, Fiat-Shamir, Guillou-Quisquarter, Schnorr, Ong-Schnorr-Shamir digital signature algorithm, Des/DSA, ECDSA (elliptic curve digital signature algorithm) and finite automaton digital signature algorithm, etc. The cloud server or UE may verify the signature of the second data string using an issuing public key to verify the signature of the second data string, so as to verify whether the trusted time information is indeed issued by the trusted time issuing device, enhancing security for the second data string.

Further, in step 403, the cloud server receives a response from the trusted time issuing device, which may include the following steps. The cloud server receives a digital certificate and a verifying public key sent from the trusted time issuing device, where the digital certificate is generated by a certifying device based on the received issuing public key sent from the trusted time issuing device and issuing-server information of the trusted time issuing device through encrypting the issuing public key and the issuing-server information using a verifying private key.

In particular, the trusted time issuing device sends the issuing public key and issuing-server information of the trusted time issuing device to a certifying device. The certifying device generates a digital certificate by encrypting the issuing public key and the issuing-server information using a verifying private key, and sends the digital certificate and the verifying public key to the trusted time issuing device. After being received by the trusted time issuing device, the digital certificate and the verifying public key are sent to the cloud server. In this manner, credibility is further enhanced for the trusted time issuing device. The evidence-preserving system may be further equipped with a certifying device that authenticates the identity of the trusted time issuing device. The trusted time issuing device sends the issuing public key and issuing-server information to the certifying device. The certifying device generates a digital certificate by encrypting the issuing public key and the issuing-server information using a verifying private key, and sends the digital certificate and the verifying public key to the trusted time issuing device. The trusted time issuing device then sends the digital certificate and the verifying public key to the cloud server.

Accordingly, the method may further include: the cloud server sends the second data string, digital certificate and verifying public key to the UE.

Particularly, the cloud server may send the second data string, digital certificate and verifying public key to the UE or any other organization or individual in need of a certificate for the data information. When the user or another party needs a certificate to be issued for some data information, the certificate issuing request may be sent to the cloud server via an interface provided on the UE or cloud server, where the certificate issuing request may carry the first data string. The cloud server determines the second data string according to the first data string, and sends the second data string and the verifying public key to the certificate requester. Using the verifying public key, the certificate requester verifies the digital certificate to confirm whether the identity of the trusted time issuing device is legal. If the verification is passed, the signature in the second data string will then be verified using the issuing public key in the digital certificate. If successfully passed, the first data string, and the trusted time information for attesting the time when the first data string is fixed, will be obtained. Integrity verification for the data information will be performed using the first data string, the particulars of which will not be repeated herein.

Further, for the step 402 in which the cloud server sends to the trusted time issuing device a trusted time issuing request, the request information may be transported through the modes described in the following:

Mode one: after a Socket connection is established with the trusted time issuing device, sending the trusted time issuing request via the Socket connection.

In particular, the issuing-server listens at a certain port for a Socket request sent from the cloud server. When a Socket connection is established between the cloud server and said port of the issuing-server, the trusted time issuing request may be sent via the Socket connection to the issuing-server. The issuing-server will also return generated time stamp via this Socket connection to the cloud server.

Mode two: after a web connection is established with the trusted time issuing device, the trusted time issuing request is sent using a hypertext transfer protocol (HTTP) or security-oriented HTTP channel (HTTPS).

In particular, when the cloud server has established connection with a web page pre-requested by the issuing-server, the trusted time issuing request may be sent to the issuing-server using HTTP. The issuing-server will also return generated time stamp via HTTP to the cloud server.

Mode three: after an email connection is established with the trusted time issuing device, the trusted time issuing request is sent using a mail transfer protocol (e.g. SMTP).

In particular, the cloud server sends the trusted time issuing request, via an email delivered using a mail transfer protocol (e.g. SMTP) to an email address preassigned by the issuing-server, to the issuing-server. The issuing-server will also return generated time stamp using SMTP to the cloud server.

Mode four: after a connection in compliance with a communication protocol that is predetermined by both ends is established with the trusted time issuing device, the trusted time issuing request is sent via the connection.

In the present embodiment, the method further includes the following steps:

Before storing the data information in association with the first data string, if instruction is received from the UE which indicates that the data information should be saved in an encrypted form, or if the data information is determined to be encrypted, the data information is encrypted.

Particularly, according to individual needs on confidentiality, the user may pre-encrypt the data information, or select an encrypting functionality when uploading the data information using the UE. When the user selects the encrypting functionality, the UE instructs the cloud server to encrypt the data information before saving the same. In these two cases, the cloud server will encrypt the data information before saving the same, further improving security for the data information.

In the present embodiment, the method further includes the following steps:

After the data information is stored in association with the first data string, a reception message is sent to the UE which indicates that saving is successful. The saving successful reception message includes description of the data information, and the time information passing the integrity verification.

Particularly, after storing the data information, the cloud server will send a saving successful reception message to the UE, so as to inform the user that the user preserving service has been received and the user uploaded data has been saved by the preserving service. The saving successful reception message may include description information and saving time information of the data information, where the description information may be, for example, the format, size, etc. of the data information, and the saving time information is used for indicating the time when the data information is saved on the cloud server.

In the present embodiment, the method further includes the following steps:

After response from the trusted time issuing device is received, a preserving successful reception message is sent to the UE, where the preserving successful reception message includes the user's real-name information, the first data string and preserving time information.

Particularly, the preserving successful reception message is used for indicating to the user that the uploaded data has been successfully preserved as evidence. The preserving successful reception message may be presented in various forms, such as a preserving certificate that records the first data string, the real name of the person making the preserving, and preserving time corresponding to the trusted time stamp, so as to prove what kind of data information was preserved as evidence at what time and by who.

The present embodiment employs the first data string to implement integrity verification for the data information, ensuring the integrity of the data information. Through issuing trusted time information by the trusted time issuing device that is synchronized with the reliable time source, reliability of the data information time is ensured. Moreover, the data information processing is handled by a uninterested third party other than the user, enhancing the credibility of the data information as electronic evidence, and ensuring reliable protection by taking the data information as the time of creating the invention when seeking IP protection.

Figure 5A:
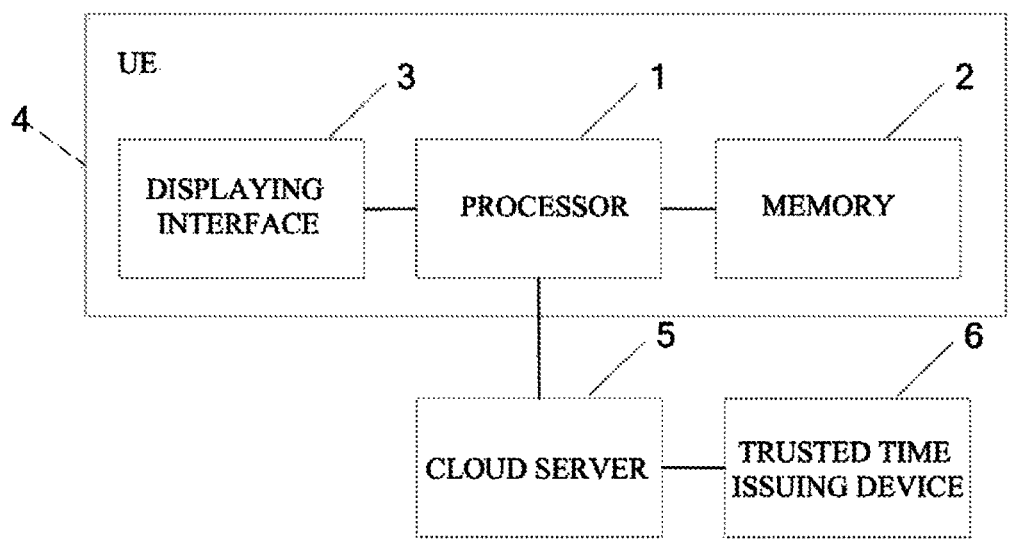
FIG. 5A is a schematic structural diagram of a first embodiment of a user equipment (UE) according to the present disclosure.

FIG. 5A is a schematic structural diagram of a first embodiment of a user equipment (UE) according to the present disclosure. As depicted in FIG. 5A, the present embodiment provides a UE that can, in particular, implement each step of the embodiment of the method for processing innovation-creativity data information, which will not be repeated herein.

Figure 5B:
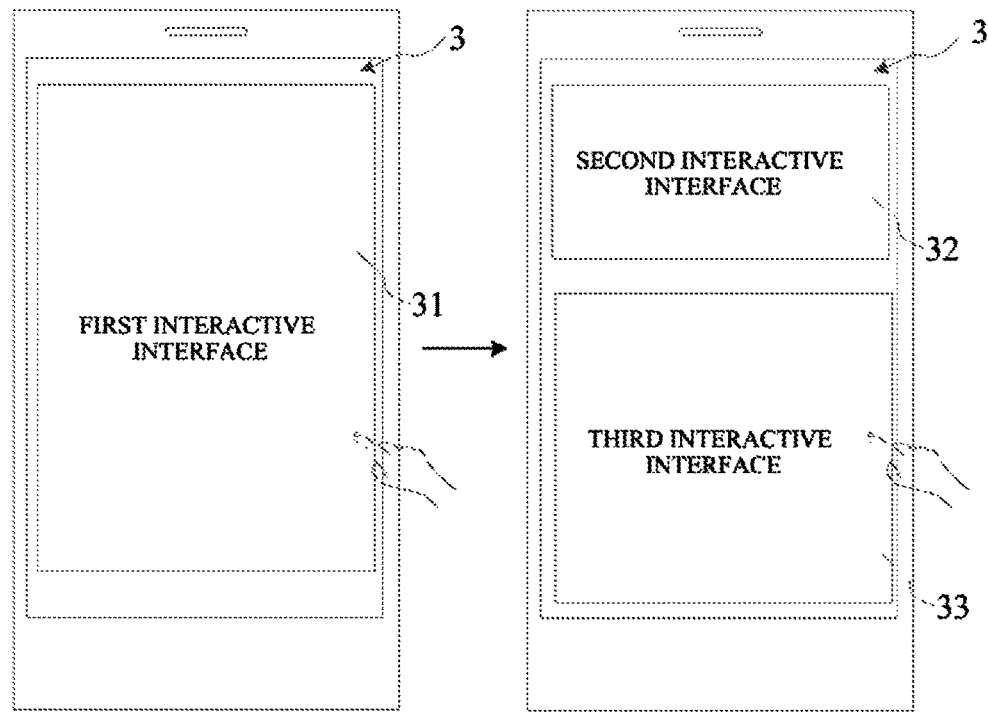
FIGS. 5B to 5C are schematic diagrams of interfaces shown when the exemplary embodiment in FIG. 5A is implemented.
Figure 5C:
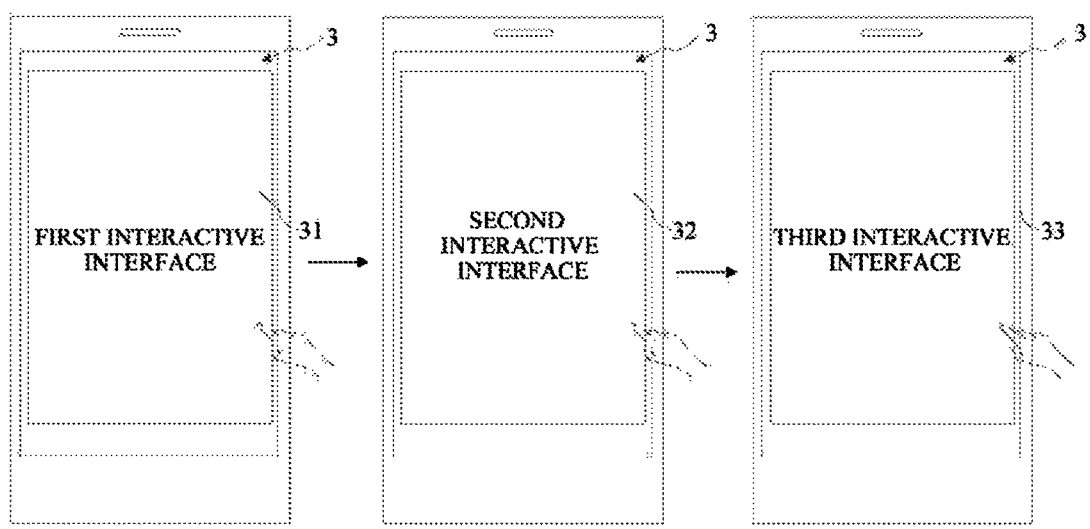

The present embodiment provides a UE 4 that particularly includes: a processor 1; a memory 2; and a displaying interface 3, where, as depicted in FIG. 5B, the displaying interface 3 includes:

a first interactive interface 31 for displaying a login interface to a user;

a second interactive interface 32 for displaying, after a successful login, a collecting mode selecting interface including at least two data information collecting modes to the user; and a third interactive interface 33 for displaying a data information input interface corresponding to a selected collecting mode to the user, where, as an example only, the second interactive interface 32 and the third interactive interface 33 may appear together in the same interactive interface. That is, the content of the aforementioned two interactive interfaces may be displayed simultaneously on the screen of the UE 4, as depicted in FIG. 5B. As another example only, they may also appear as separate interactive interfaces. That is, only one of the second interactive interface 32 and the third interactive interface 33 is displayed on the screen of the UE 4, and the two interactive interfaces may, for example, be triggered and switched by triggering from a user finger (which is an example only), as depicted in FIG. 5C.

The processor 1 is configured to: trigger the display of the first interactive interface 31, and receive login information inputted by the user on the first interactive interface 31; after a successful login, trigger the display of the second interactive interface 32, and receive a collecting mode selecting instruction triggered by the user on the second interactive interface 32; display a third interactive interface 33 corresponding to a selected collecting mode to the user; receive data information inputted by the user on the third interactive interface 33, and store the data information in the memory 2, and/or send the data information to a cloud server 5 for storage.

The processor 1 is particularly configured to: generate a first data string based on the data information; send the data information and the first data string to the cloud server 5, enabling the cloud server 5 to verify the integrity of the data information according to the first data string; receive the first data string or a second data string returned from the cloud server 5, and display a cloud server 5 preserving information on a current page; if the first data string or the second data string returned from the cloud server 5 is not received, display non-preserving information on the current page, the non-preserving information indicating that the data information is not preserved as evidence on the cloud server 5, where the second data string includes the first data string and time information of the cloud server 5, and the time information is trusted time information issued by a trusted time issuing device 6 based on the time when the first data string is received.

Figure 6A:
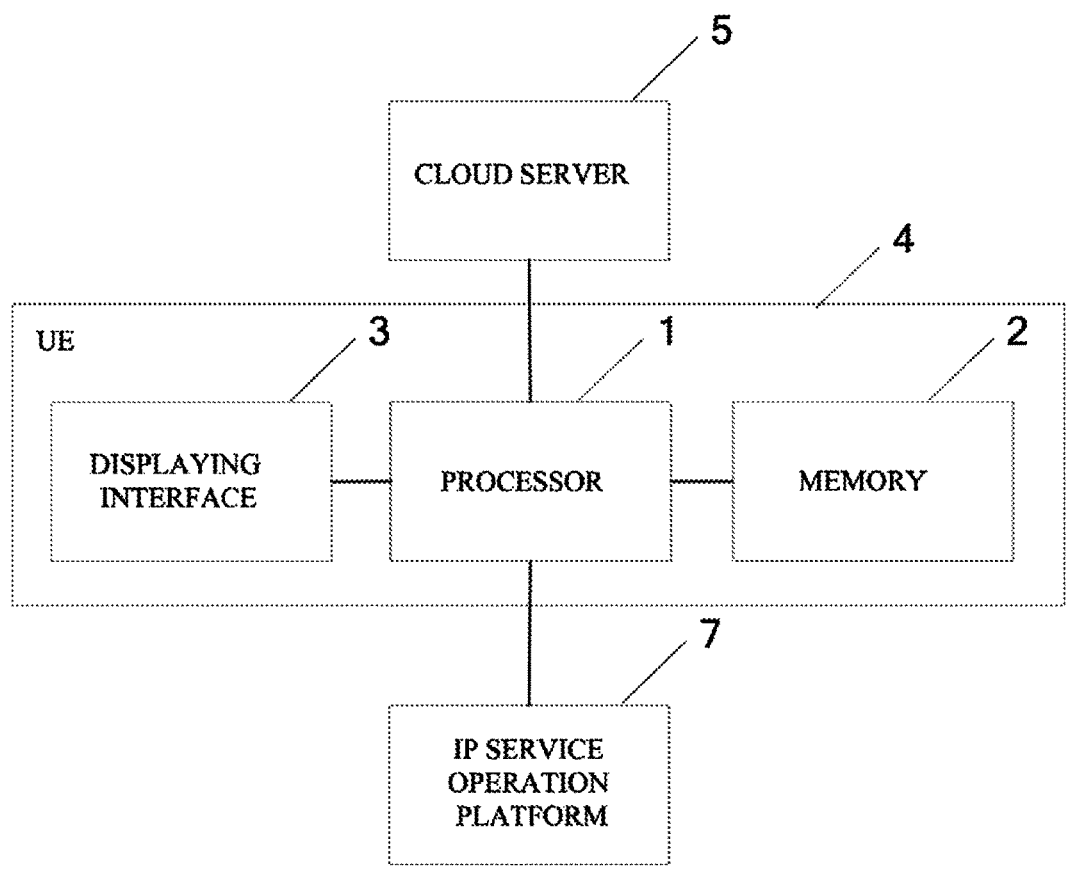
FIG. 6A is a schematic structural diagram of a second embodiment of a UE according to the present disclosure.

FIG. 6A is a schematic structural diagram of a second embodiment of a UE according to the present disclosure. FIGS. 6A to 6I are schematic diagrams of interfaces shown when the exemplary embodiment in FIG. 6A is implemented.

As depicted in FIGS. 6A to 6I, the present embodiment provides a UE that can, in particular, implement each step of the embodiment of the method for processing innovation-creativity data information, which will not be repeated herein. It should be noted that, FIGS. 6A to 6I are exemplary illustrations of the displaying interface 3 of the UE 4 only, where associations between respective interactive interfaces may be determined by those of ordinary skill in the art according to the functions required, and will not be limited in the present disclosure.

Figure 6B:
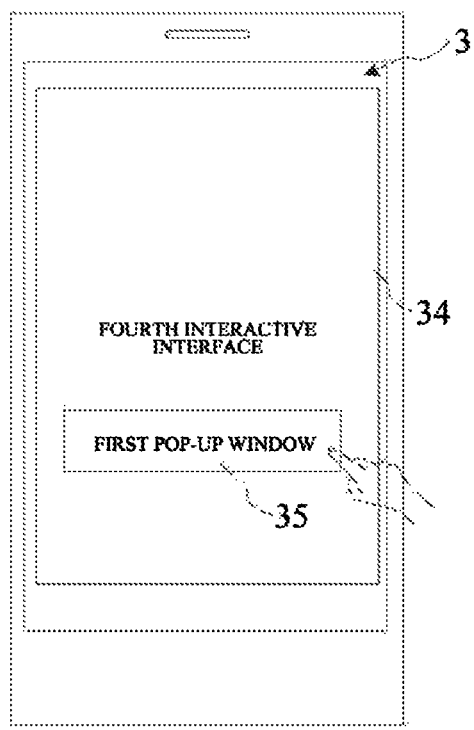

On the basis of the foregoing embodiments, the present embodiment provides a UE in which the displaying interface 3 further includes, as depicted in FIG. 6B:

a fourth interactive interface 34 for displaying a list of data information which is not stored on the cloud server 5;

a first pop-up window 35 for displaying, to a user, prompt information on whether the selected data information is to be sent to the cloud server 5;

where the processor 1 is further configured to: trigger the display of the fourth interactive interface 34, and receive a triggered operating instruction by which the user selects data information on the fourth interactive interface 34; display, to the user, the first pop-up window 35 that prompts for whether the selected data information is to be sent to the cloud server 5; if the user responds affirmatively, send the selected data information to the cloud server 5 and receive the first data string or a second data string returned from the cloud server 5; and update the state of the selected data information to an evidence preserved state.

Further, in the case where the data information is collected as text, the processor 1 is particularly configured to receive in real-time text data information inputted by the user, or receive text data information selected by the user from the memory 2.

Or, in the case where the data information is collected as image, the processor 1 is particularly configured to receive in real-time image data information captured by the user, or receive image data information selected by the user from the memory 2.

Or, in the case where the data information is collected as audio record, the processor 1 is particularly configured to receive in real-time audio data information recorded by the user, or receive audio data information selected by the user from the memory 2.

Or, in the case where the data information is collected as video record, the processor 1 is particularly configured to receive in real-time video data information recorded by the user, or receive video data information selected by the user from the memory 2.

Or, in the case where the data information is collected as files, the processor 1 is particularly configured to receive a file selected by the user from the memory 2 and/or a third-party device.

Figure 6C:
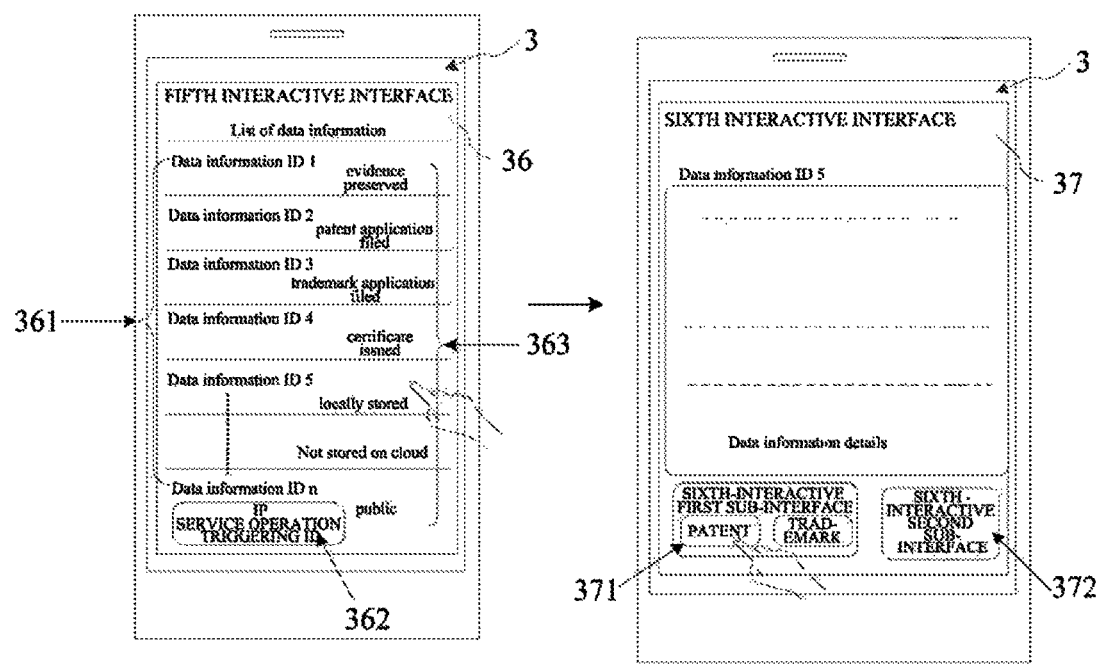
Figure 6D:
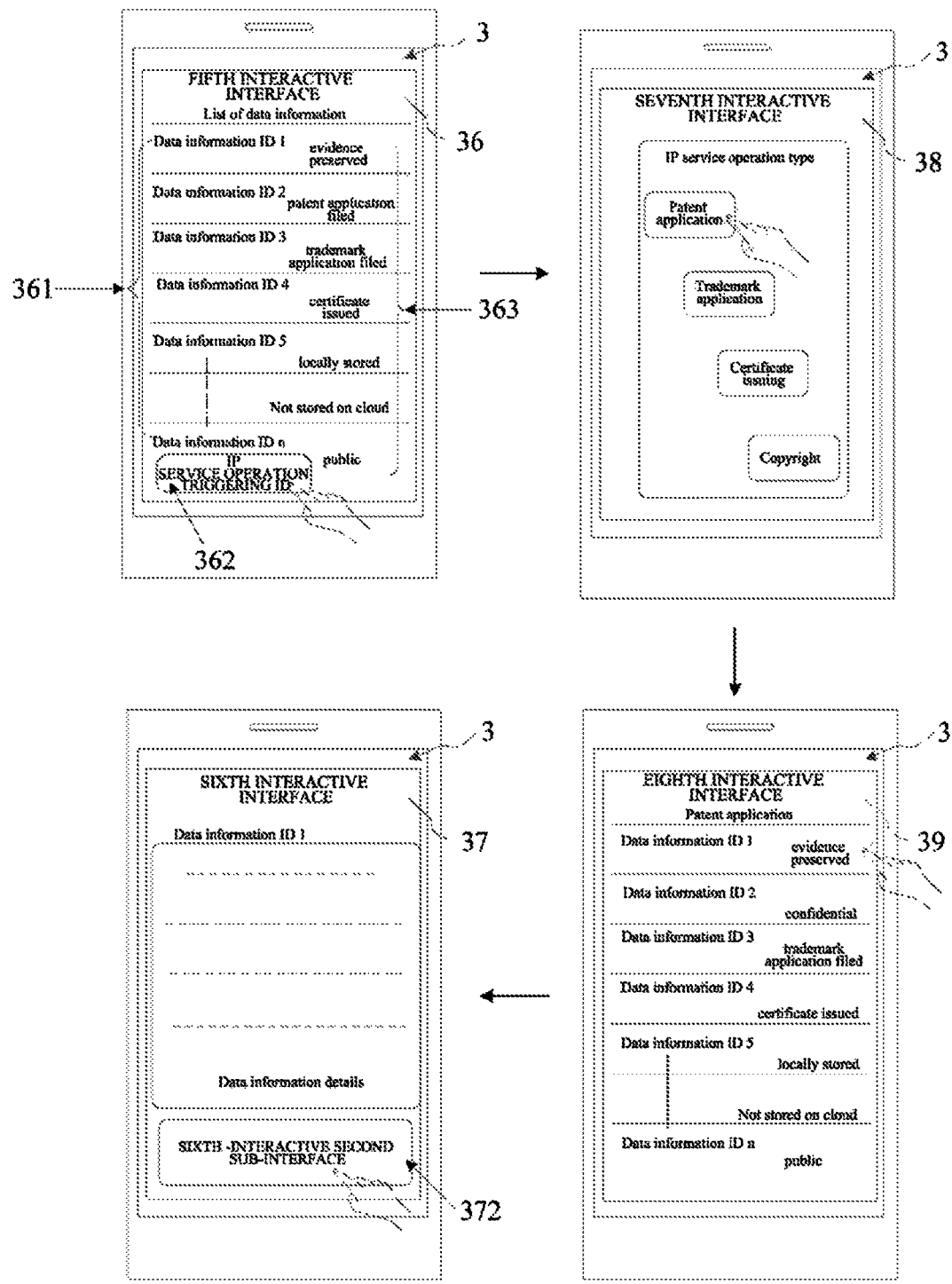

Further, the displaying interface 3 further includes, as depicted in FIGS. 6C and 6D:

a fifth interactive interface 36 for displaying a list of all stored data information to the user, where the list includes identification (ID) 361 of each stored data information, an intellectual property (IP) service operation triggering ID 362, and state information 363 of each data information;

a sixth interactive interface 37 for displaying a detail-presenting interactive interface corresponding to the selected data information to the user;

a sixth-interactive first sub-interface 371 for displaying at least one IP service operation type on the sixth interactive interface 37;

a sixth-interactive second sub-interface 372 for displaying a submission triggering ID on the sixth interactive interface 37;

a seventh interactive interface 38 for displaying, after the user triggers the IP service operation triggering ID 362, an IP service operation interface that includes at least one IP service operation type to the user;

an eighth interactive interface 39 for displaying a list of all data information that matches a selected IP service operation type, where the processor 1 is further configured to: trigger the display of the fifth interactive interface 36, and receive a triggered operating instruction by which the user selects data information on the list of all data information on the fifth interactive interface 36; display the sixth interactive interface 37 corresponding to the selected data information to the user, where the sixth interactive interface 37 includes the sixth-interactive first sub-interface 371, receive a triggered operating instruction by which the user selects an IP service operation type on the sixth-interactive first sub-interface 371; the sixth interactive interface 37 further includes the sixth-interactive second sub-interface 372, receive from the user a submission triggering instruction on the sixth-interactive second sub-interface 372, submit the selected IP service operation type and the selected data information to an IP service operation platform 7; and update the state information of the selected data information.

or, where the processor 1 is further configured to: trigger the display of the fifth interactive interface 36, receive a triggered operating instruction by the user on the fifth interactive interface 36 for the IP service operation triggering ID 362, display the seventh interactive interface 38 to the user; receive a triggered operating instruction by which the user selects an IP service operation type on the seventh interactive interface 38, display the eighth interactive interface 39 that matches the selected IP service operation type; receive a triggered operating instruction by which the user selects data information on the eighth interactive interface 39; display the sixth interactive interface 37 to the user, which includes the sixth-interactive second sub-interface 372; receive from the user a submission triggering instruction on the sixth-interactive second sub-interface 372, submit the selected IP service operation type and the selected data information to the IP service operation platform 7; and update the state information of the selected data information.

Figure 6E:
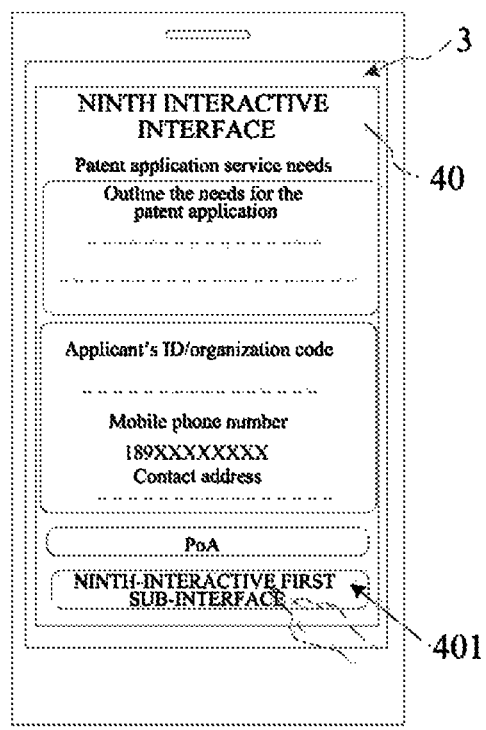

Further, as depicted in FIG. 6E, the displaying interface 3 further includes:

a ninth interactive interface 40 for displaying a service need input interface corresponding to the selected IP service operation type;

a ninth-interactive first sub-interface 401 for displaying a submission triggering ID on the ninth interactive interface 40;

the processor 1 is further configured to: acquire service need information required by the ninth interactive interface 40; receive a triggering instruction by which the user triggers on the ninth interactive first sub-interface 401 the submission of the service need information; and package the selected data information and the service need information and submit to the IP service operation platform 7.

Further, the processor 1 is particularly configured to: extract the service need information from the user information in the memory 2, and/or from the legal information stored on the IP service operation platform 7.

Figure 6F:
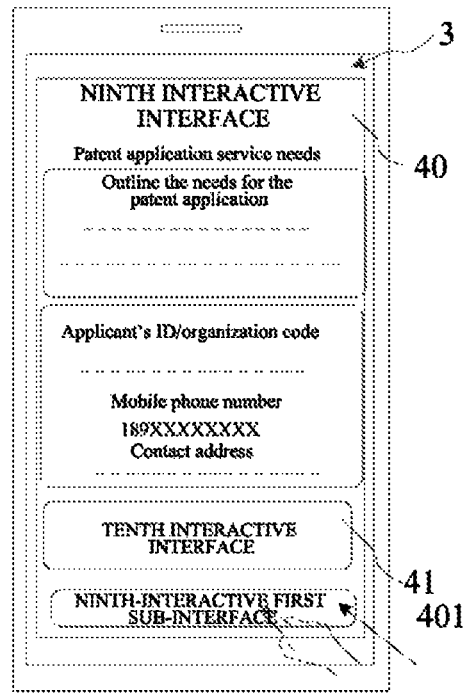

Further, as depicted in FIG. 6F, the displaying interface 3 further includes:

a tenth interactive interface 41 for displaying service supplementary information;

Where the tenth interactive interface 41 and the ninth interactive interface 40 may appear together in the same interactive interface, that is, the content of the aforementioned two interactive interfaces may be displayed simultaneously on the screen of the UE 4; or alternatively appear as different interactive interfaces, that is, the ninth interactive interface 40 may be displayed on the screen of the UE 4 at first, and the tenth interactive interface 41 may be displayed after content on the ninth interactive interface 40 has been confirmed.

The processor 1 is further configured to: receive service supplementary information inputted on the tenth interactive interface 41; and submit the service supplementary information to the IP service operation platform 7, where the receiving inputted service supplementary information includes: triggering an APP corresponding to voice or video recording or photo capturing and collecting service supplementary information in a corresponding format; or, selecting the service supplementary information from a file locally stored in the memory 2.

Figure 6G:
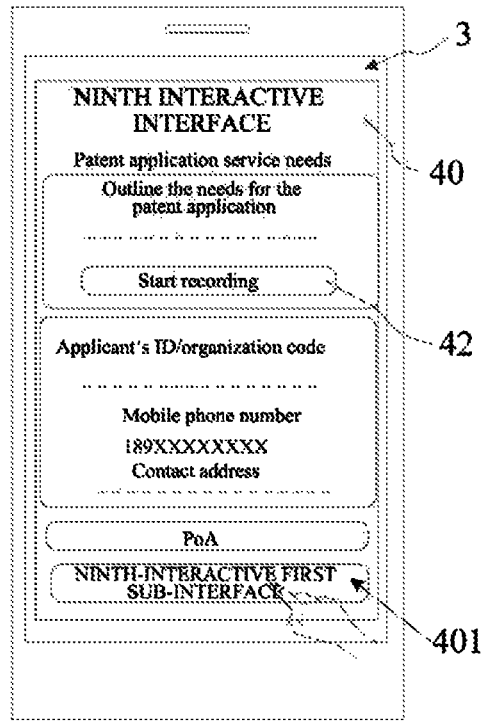

Further, as depicted in FIG. 6G, the displaying interface 3 further includes:

a voice input identifier 42 embedded in an interactive interface for any text information input;

where the processor 1 is further configured to: after an instruction for triggering the voice input identifier 42 is received from the user, trigger a voice recognition program to convert, in real-time, the voice information into text information, and display and store the converted text information.

It should be noted that, FIG. 6G is an exemplary illustration only, and the voice input identifier 42 may be embedded in any of the schematic diagrams of FIGS. 5B-5C and 6B-6F.

Further, the processor 1 is further configured to: generate an unsigned document required by an operation corresponding to the selected IP service operation type, and send the unsigned document to a user registered communication APP. Here, the registered communication APP may include at least one of a socializing APP, short messaging, multimedia messaging (MMS), mail and instant messaging (IM) APP.

Figure 6H:
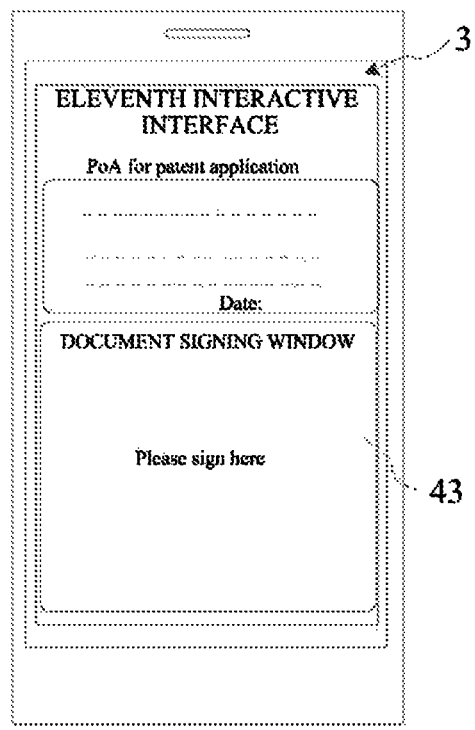

Further, as depicted in FIG. 6H, the displaying interface 3 further includes:

an eleventh interactive interface 43 for displaying an interactive interface for an unsigned document required by an operation corresponding to the selected IP service operation type; and displaying a document signing window;

the processor 1 is further configured to: receive signature information inputted by the user in the document signing window on the eleventh interactive interface 43; and send the signature information to the cloud server 5 or the IP service operation platform 7.

Further, the processor 1 is further configured to: receive an operation acceptance message returned from the IP service operation platform 7; push to the user an operation order generation message; receive notification information indicating that the user has completed a payment according to the operation order generation message; update the state information of the data information; and display a list of updated data information in the fifth interactive interface 36. Here, the processor 1 is particularly configured to: receive notification information indicating that the user has completed a payment, via a third party payment processing platform, according to the operation order generation message.

Figure 6I:
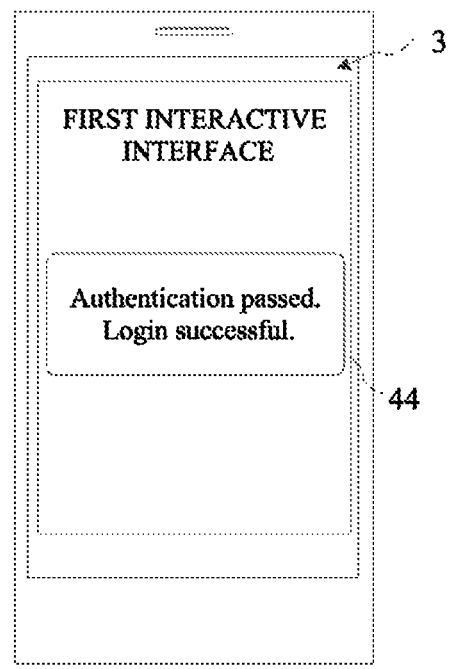

Further, as depicted in FIG. 6I, the displaying interface 3 further includes:

a second pop-up window 44 for displaying, after a successful login, a login successful message to the user, where the processor 1 is further configured to: after login information inputted by the user on the first interactive interface 31 is received, receive user signature information for the data information; and after an authentication is passed, trigger the second pop-up window 44 to display the login successful message.

In the present embodiment, the specific manners for performing operations by respective modules therein have been described in detail in the embodiments regarding the related methods, which will not be elaborated herein.

Figure 7:
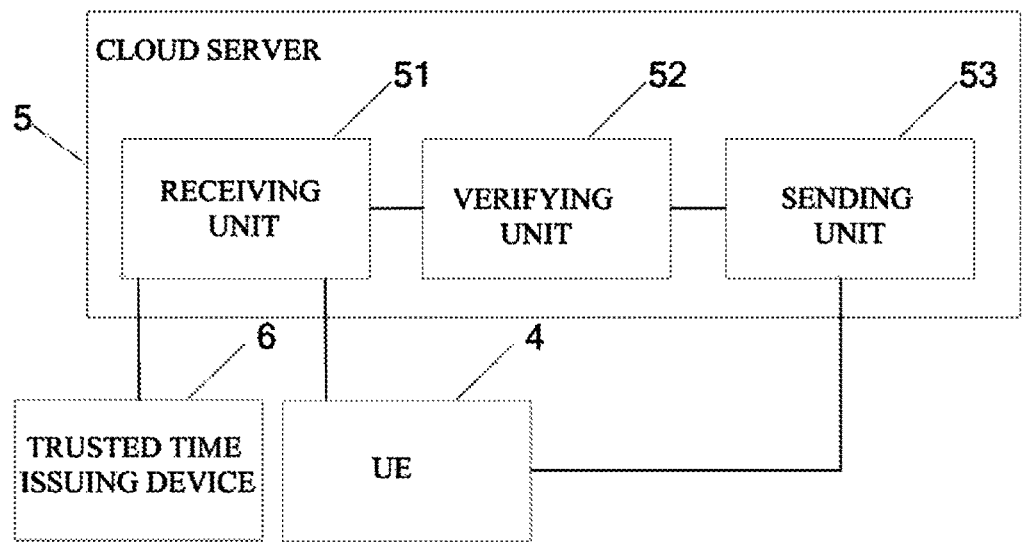
FIG. 7 is a schematic structural diagram of a first embodiment of a cloud server according to the present disclosure.

FIG. 7 is a schematic structural diagram of a first embodiment of a cloud server according to the present disclosure. As depicted in FIG. 7, the present embodiment provides a cloud server 5, including:

a receiving unit 51 configured to receive a first data string and data information sent by a UE 4;

a verifying unit 52 configured to verify the integrity of the data information using the first data string, where the first data string is generated based on, and uniquely associated with the data information;

a sending unit 53 configured to: if the verification at the verifying unit 52 is successful, send a trusted time issuing request carrying the first data string to a trusted time issuing device 6, so that the trusted time issuing device 6 issues trusted time information based on the time when the request is received;

where the receiving unit 51 is further configured to receive a response from the trusted time issuing device 6, where the response includes a second data string that includes the first data string and the trusted time information;

the sending unit 53 is further configured to store the second data string in association with the first data string.

Further, the second data string may be a data string signed by the trusted time issuing device 6 using an issuing private key.

Further, the receiving unit 51 is further configured to receive a digital certificate and a verifying public key sent from the trusted time issuing device 6, where the digital certificate is generated by a certifying device based on an issuing public key sent from the trusted time issuing device 6 and issuing-server information of the trusted time issuing device 6 by encrypting the issuing public key and the issuing-server information using a verifying private key.

Accordingly, the sending unit 53 is further configured to send the second data string, digital certificate and verifying public key to the UE 4.

Further, the sending unit 53 is particularly configured to: after a Socket connection is established with the trusted time issuing device 6, send the trusted time issuing request via the Socket connection; or, particularly configured to: after a web connection is established with the trusted time issuing device 6, send the trusted time issuing request using a hypertext transfer protocol (HTTP) or security-oriented HTTP channel (HTTPS); or, particularly configured to: after a connection in compliance with a communication protocol that is predetermined by both ends is established with the trusted time issuing device 6, send the trusted time issuing request via the connection.

Figure 8:
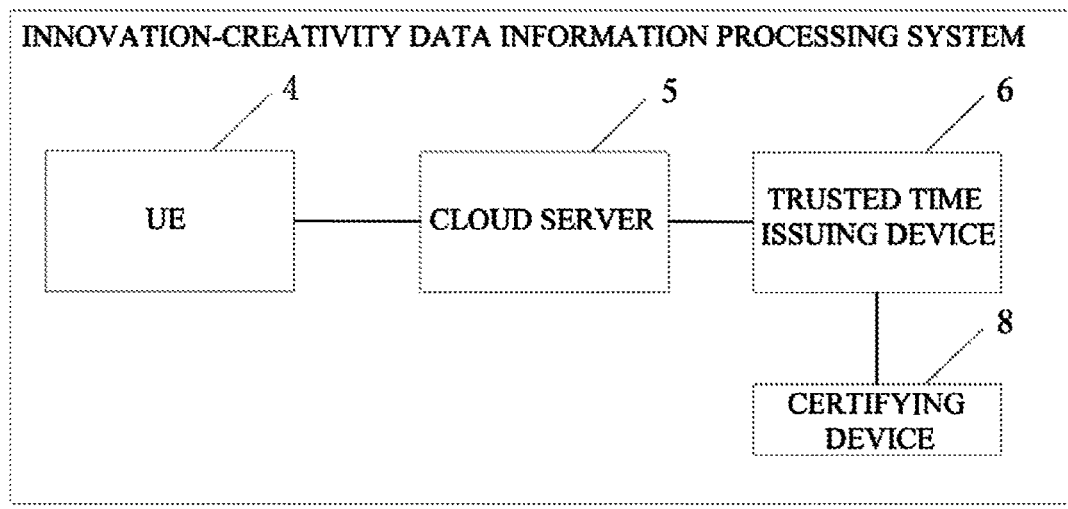
FIG. 8 is a schematic structural diagram of a first embodiment of an innovation-creativity data information processing system according to the present disclosure.

FIG. 8 is a schematic structural diagram of a first embodiment of an innovation-creativity data information processing system according to the present disclosure. As depicted in FIG. 8, the present embodiment provides an innovation-creativity data information processing system, including a UE 4 provided in any of the disclosed embodiments, a cloud server 5 provided in any of the disclosed embodiments, and a trusted time issuing device 6.

Further, the system may further include: a certifying device 8 configured to receive the issuing public key and issuing-server information sent from the trusted time issuing device 6. A digital certificate is generated by encrypting the issuing public key and the issuing-server information using a verifying private key, and the digital certificate and the verifying public key are sent to the trusted time issuing device 6.

Persons of ordinary skill in the art may understand that, all or a part of steps of the foregoing method embodiments may be implemented by a program instructing relevant hardware. The program may be stored in a computer readable storage medium. When the program runs, the steps of the foregoing embodiment methods are performed. The foregoing storage medium includes various mediums capable of storing program codes, such as a ROM (read only memory), a RAM (random access memory), a magnetic disk, or an optical disc.

Lastly, it should be noted that the foregoing embodiments are merely intended for explaining, rather than limiting, the technical solutions of the present disclosure. Although the present disclosure is explained in detail with reference to the foregoing embodiments, persons of ordinary skill in the art should understand that it remains possible to make modifications to the technical solutions described in the foregoing embodiments, or make equivalent replacements to some of the technical features therein, and these modifications or replacements do not make the essence of corresponding technical solutions depart from the spirit and scope of the technical solutions in the embodiments of the present disclosure.

What is claimed is:

1. An innovation-creativity data information processing method, comprising:

displaying a login interface to a user, and receiving login information inputted by the user on the login interface;

after a successful login, displaying a collecting mode selecting interface comprising at least two data information collecting modes to the user;

receiving a selecting instruction triggered by the user on the collecting mode selecting interface, and displaying a data information input interface corresponding to a selected collecting mode to the user;

receiving data information inputted by the user on the data information input interface, if Internet access is unavailable, storing the data information in a user equipment (UE), and if the Internet access is available, sending the data information to a cloud server for storage, wherein the sending the data information to a cloud server for storage comprises:

generating a first data string based on the data information; sending the data information and the first data string to the cloud server, enabling the cloud server to verily integrity of the data information according to the first data string; if the first data string or the second data string returned from the cloud server is received, displaying cloud server preserving information on a current page; if the first data string or the second data string returned from the cloud server is not received, displaying a non-preserving information on the current page, the non-preserving information indicating that the data information is not preserved as evidence on the cloud server, and storing the data information in the UE;

wherein the second data string is signed by a trusted time issuing device using an issuing private key and comprises the first data string and time information, and the time information is trusted time information issued by the trusted time issuing device based on time when the first data string is received;

wherein after the storing the data information in the UE or the sending the data information to a cloud server for storage, the method further comprises:

displaying a list of all stored data information to the user, wherein the list comprises identification (ID) of each stored data information, an intellectual property (IP) service operation triggering ID, and state information of each data information; and receiving a triggered operating instruction by which the user selects data information on the list; displaying a detail-presenting interactive interface corresponding to the selected data information to the user, wherein the detail-presenting interactive interface comprises at least one IP service operation type; receiving a triggered operating instruction by which the user selects an IP service operation type in the detail-presenting interactive interface; receiving from the user a submission triggering instruction to submit the selected IP service operation type and the selected data information to an IP service operation platform; and updating the state information of the selected data information;

or, displaying a list of all stored data information to the user, wherein the list comprises ID of each stored data information, an IP service operation triggering ID and state information of each data information; and receiving a triggered operating instruction from the user for the IP service operation triggering ID, and displaying, to the user, an IP service operation interface that comprises at least one IP service operation type; receiving a triggered operating instruction by which the user selects an IP service operation type on the IP service operation interface, and displaying a list of all data information that matches the IP service operation type; receiving a triggered operating instruction by which the user selects data information on the list, and displaying a detail-presenting interactive interface corresponding to the selected data information to the user; receiving from the user a submission triggering instruction, and submitting the selected IP service operation type and the selected data information to an IP service operation platform; and updating the state information of the selected data information.

2. The method according to claim 1, further comprising:
displaying a list of data information which is not stored on the cloud server; receiving a triggered operating instruction by which the user selects data information; displaying, to the user, prompt information on whether the selected data information is to be sent to the cloud server; if the user responds affirmatively, sending the selected data information to the cloud server and receiving the first data string or the second data string returned from the cloud server; and updating a state of the selected data information to an evidence preserved state.

3. The method according to claim 1, wherein after the receiving a triggered operating instruction by which the user selects an IP service operation type and the receiving a triggered operating instruction by which the user selects data information, the method further comprises:
displaying a service need input interface corresponding to the selected service operation type; acquiring service need information required by the service need input interface;
receiving a triggering instruction by which the user triggers submission of the service need information; and
accordingly, the submitting the selected IP service operation type and the selected data information to an IP service operation platform comprises:
packaging the selected data information and the service need information and submitting to the IP service operation platform.

4. The method according to claim 1, wherein after the receiving a triggered operating instruction by which the user selects an IP service operation type and the receiving a triggered operating instruction by which the user selects data information, the method further comprises:
receiving inputted service supplementary information, and submitting the service supplementary information to the IP service operation platform, wherein the receiving inputted service supplementary information comprises: triggering an application (APP) corresponding to voice or video recording or photo capturing and collecting service supplementary information in a format corresponding to the APP; or, selecting the service supplementary information from a file locally stored in the UE.

5. The method according to claim 1, wherein after submitting to the IP service operation platform, the method further comprises:
generating an unsigned document required by an operation corresponding to the selected IP service operation type; sending the unsigned document to a user-registered communication APP, wherein the registered communication APP comprises at least one of a socializing APP, a short messaging, a multimedia messaging (MMS), a mail and an instant messaging (IM) APP.

6. The method according to claim 1, wherein after submitting to the IP service operation platform, the method further comprises:
displaying an interactive interface for an unsigned document required by an operation corresponding to the selected IP service operation type; displaying a document signing window, and receiving signature information inputted by the user in the document signing window; and sending the signature information to the cloud server or the IP service operation platform.

7. The method according to claim 1, wherein after submitting to the IP service operation platform, the method further comprises:
receiving an operation acceptance message returned from the IP service operation platform; pushing to the user an operation order generation message;
receiving notification information indicating that the user has completed a payment according to the operation order generation message;
updating the state information of the data information; and displaying a list of updated data information.

8. An innovation-creativity data information processing method, comprising:
receiving a first data string and data information sent from a user equipment (UE);
verifying integrity of the data information using the first data string, wherein the first data string is generated based on, and uniquely associated with the data information;
if the verification is successful, storing the data information in association with the first data string, and sending to a trusted time issuing device a trusted time issuing request carrying the first data string, enabling the trusted time issuing device to issue trusted time information based on time when the request is received;
receiving a response from the trusted time issuing device, wherein the response comprises a second data string that comprises the first data string and the trusted time information; and
storing the second data string in association with the first data string,
wherein the second data string is a data string signed by the trusted time issuing device using an issuing private key; and
sending the second data string, the digital certificate and the verifying public key to the UE.

9. The method according to claim 8, wherein the receiving a response from the trusted time issuing device comprises:
receiving a digital certificate and a verifying public key sent from the trusted time issuing device, wherein the digital certificate is generated by a certifying device based on an issuing public key sent from the trusted time issuing device and issuing-server information of the trusted time issuing device through encrypting the issuing public key and the issuing-server information using a verifying private key.

10. The method according to claim 8, wherein the sending to a trusted time issuing device a trusted time issuing request carrying the first data string comprises:
after a socket connection is established with the trusted time issuing device, sending the trusted time issuing request via the socket connection; or,
after a web connection is established with the trusted time issuing device, sending the trusted time issuing request using hypertext transfer protocol (HTTP) or security-oriented HTTP channel (HTTPS); or,
after an email connection is established with the trusted time issuing device, sending the trusted time issuing request using a mail transfer protocol; or,
after a connection in compliance with a communication protocol that is predetermined by both ends is established with the trusted time issuing device, sending the trusted time issuing request via the connection.

11. A user equipment (UE) comprising:
a processor, a memory, and a displaying interface, wherein:
the displaying interface comprises:
a first interactive interface for displaying a login interface to a user;
a second interactive interface for displaying, after a successful login, a collecting mode selecting interface comprising at least two data information collecting modes to the user;
a third interactive interface for displaying a data information input interface corresponding to a selected collecting mode to the user;
wherein the processor is configured to: trigger the display of the first interactive interface, receive login information inputted by the user on the first interactive interface; after the successful login, trigger the display of the second interactive interface, and receive a collecting mode selecting instruction triggered by the user on the second interactive interface; display the third interactive interface corresponding to the selected collecting mode to the user; receive data information inputted by the user on the third interactive interface; if Internet access is unavailable, store the data information in the memory, and if the Internet access is available, send the data information to a cloud server for storage;
wherein the processor is specifically configured to: generate a first data string based on the data information; send the data information and the first data string to the cloud server, enabling the cloud server to verify integrity of the data information according to the first data string; if the first data string or the second data string returned from the cloud server is received, display cloud server preserving information on a current page; if the first data string or the second data string returned from the cloud server is not received, display non-preserving information on the current page, the non-preserving information indicating that the data information is not preserved as evidence on the cloud server, wherein the second data string is signed by a trusted time issuing device using an issuing private key and comprises the first data string and time information, and the time information is trusted time information issued by the trusted time issuing device based on time when the first data string is received;
wherein the displaying interface further comprises:
a fifth interactive interface for displaying a list of all stored data information to the user, wherein the list comprises identification (ID) of each stored data information, an intellectual property (IP) service operation triggering ID and state information of each data information;
a sixth interactive interface for displaying a detail-presenting interactive interface corresponding to the selected data information to the user;
a sixth-interactive first sub-interface for displaying at least one IP service operation type on the sixth interactive interface;
a sixth-interactive second sub-interface for displaying a submission triggering ID on the sixth interactive interface;
a seventh interactive interface for displaying, after the user triggers the IP service operation triggering ID, an IP service operation interface that comprises at least one IP service operation type to the user;
an eighth interactive interface for displaying a list of all data information that matches the selected IP service operation type;
wherein the processor is further configured to: trigger the display of the fifth interactive interface; receive a triggered operating instruction by which the user selects data information on the list of all data information on the fifth interactive interface; display the sixth interactive interface corresponding to the selected data information to the user, wherein the sixth interactive interface comprises the sixth-interactive first sub-interface for receiving a triggered operating instruction by which the user selects an IP service operation type on the sixth-interactive first sub-interface, the sixth interactive interface further comprises the sixth-interactive second sub-interface for receiving from the user a submission triggering instruction to submit the selected IP service operation type and the selected data information to an IP service operation platform; and update the state information of the selected data information; or,
wherein the processor is further configured to: trigger the display of the fifth interactive interface;
receive a triggered operating instruction from the user on the fifth interactive interface for the IP service operation triggering ID, display the seventh interactive interface to the user; receive a triggered operating instruction by which the user selects an IP service operation type on the seventh interactive interface, display the eighth interactive interface that matches the selected IP service operation type;
receive a triggered operating instruction by which the user selects data information on the eighth interactive interface, display the sixth interactive interface that comprises the sixth-interactive second sub-interface to the user; receive from the user a submission triggering instruction on the sixth-interactive second sub-interface to submit the selected IP service operation type and the selected data information to an IP service operation platform; and update the state information of the selected data information.

12. The UE according to claim 11, wherein the displaying interface further comprises:
a fourth interactive interface for displaying a list of data information which is not stored on the cloud server;
a first pop-up window for displaying, to the user, prompt information on whether the selected data information is to be sent to the cloud server;
wherein the processor is further configured to: trigger the display of the fourth interactive interface; receive a triggered operating instruction by which the user selects data information on the fourth interactive interface; display, to the user, the first pop-up window that prompts for whether the selected data information is to be sent to the cloud server; if the user responds affirmatively, send the selected data information to the cloud server, and receive the first data string or the second data string returned from the cloud server; and update a state of the selected data information to an evidence preserved state.

13. The UE according to claim 11, wherein the displaying interface further comprises:
a ninth interactive interface for displaying a service need input interface corresponding to the selected IP service operation type;
a ninth-interactive first sub-interface for displaying the submission triggering ID on the ninth interactive interface;
wherein the processor is further configured to: acquire service need information required by the ninth interactive interface; receive a triggering instruction by which the user triggers on the ninth-interactive first sub-interface to submit the service need information; and package the selected data information and the service need information and submit to the IP service operation platform.

14. The UE according to claim 11, wherein the displaying interface further comprises:
a tenth interactive interface for displaying service supplementary information;
wherein the processor is further configured to: receive service supplementary information inputted on the tenth interactive interface; submit the service supplementary information to the IP service operation platform, wherein the receiving inputted service supplementary information comprises: triggering an application (APP) corresponding to voice or video recording or photo capturing and collecting service supplementary information in a format corresponding to the APP; or, selecting the service supplementary information from a file locally stored in the memory.

15. The UE according to claim 11, wherein:
the processor is further configured to: generate an unsigned document required by an operation corresponding to the selected IP service operation type; send the unsigned document to a user-registered communication APP, wherein the registered communication APP comprises at least one of a socializing APP, a short messaging, a multimedia messaging (MMS), a mail and an instant messaging (IM) APP.

16. The UE according to claim 11, wherein:
the displaying interface further comprises:
an eleventh interactive interface for displaying an interactive interface for an unsigned document required by an operation corresponding to the selected IP service operation type; and displaying a document signing window,
wherein the processor is further configured to: receive signature information inputted by the user in the document signing window on the eleventh interactive interface; and send the signature information to the cloud server or the IP service operation platform.

17. The UE according to claim 11, wherein:
the processor is further configured to: receive an operation acceptance message returned from the IP service operation platform; push to the user an operation order generation message;
receive notification information indicating that the user has completed a payment according to the operation order generation message;
update the state information of the data information; and
display a list of updated data information on the fifth interactive interface.

* * * * *